US010173635B2

(12) United States Patent
Wang et al.

(10) Patent No.: US 10,173,635 B2
(45) Date of Patent: Jan. 8, 2019

(54) WEBBING ADJUSTMENT DEVICE FOR A SEAT BELT SYSTEM

(71) Applicant: Liang-Hsiung Wang, Tainan (TW)

(72) Inventors: Liang-Hsiung Wang, Tainan (TW); Chia-Chun Chu, Tainan (TW)

(73) Assignee: WANG, LIANG-HSIUNG, Tainan (TW)

( * ) Notice: Subject to any disclaimer, the term of this patent is extended or adjusted under 35 U.S.C. 154(b) by 12 days.

(21) Appl. No.: 15/415,591

(22) Filed: Jan. 25, 2017

(65) Prior Publication Data

US 2018/0050657 A1    Feb. 22, 2018

(30) Foreign Application Priority Data

Aug. 16, 2016  (TW) .............................. 105126142 A

(51) Int. Cl.
*A44B 11/10* (2006.01)
*B60R 22/20* (2006.01)
*B60R 22/18* (2006.01)

(52) U.S. Cl.
CPC .............. *B60R 22/20* (2013.01); *A44B 11/10* (2013.01); *B60R 2022/1818* (2013.01);
(Continued)

(58) Field of Classification Search
CPC ....... A44B 11/02; A44B 11/065; A44B 11/25; B60R 22/20; B60R 2022/1818;
(Continued)

(56) References Cited

U.S. PATENT DOCUMENTS 1,049,732 A * 1/1913 Kerngood .............. A44B 11/10
24/194
2,317,571 A * 4/1943 White .................... A44B 11/04
24/171
(Continued)

FOREIGN PATENT DOCUMENTS

CN    2754943 Y    2/2006
EP    1927520 A1   6/2008
(Continued)

OTHER PUBLICATIONS

European search report corresponding to application No. EP17159356-1503 dated Aug. 24, 2017; pp. 1-6.
(Continued)

*Primary Examiner* — Robert Sandy
*Assistant Examiner* — Michael S Lee
(74) *Attorney, Agent, or Firm* — Muncy, Geissler, Olds & Lowe, P.C.

(57) ABSTRACT

A webbing adjustment device for a seat belt system has a frame and a slider. The frame has a first hole and a second hole below the first hole. A front section of a webbing extends through the second hole of the frame. The slider is detachably connected to the frame. The slider has a first end portion, a second end portion, a connecting portion, and a through groove. The connecting portion is formed between the first end portion and the second end portion. The through groove is formed through the connecting portion. The connecting portion of the slider is inserted through the first hole, and a rear section of the webbing is passed through the first hole and the through groove, and the rear section is locked or unlocked by a relative motion between the frame and the slider.

3 Claims, 20 Drawing Sheets

(52) U.S. Cl.
CPC ....... *B60Y 2304/05* (2013.01); *Y10T 24/4019* (2015.01); *Y10T 24/4084* (2015.01)

(58) Field of Classification Search
CPC . B60R 22/30; B60Y 2304/05; Y10T 24/4084; Y10T 24/4019; Y10T 24/4079
See application file for complete search history.

(56) References Cited

U.S. PATENT DOCUMENTS 3,293,713 A * 12/1966 Gaylord ................ A44B 11/10
24/196
4,834,427 A    5/1989 Takada

FOREIGN PATENT DOCUMENTS

| TW | 332505 U | 5/1998 |
| TW | 201336715 A | 9/2013 |

OTHER PUBLICATIONS

Taiwanese Office Action corresponding to application No. TW 105126142; pp. 1-3.

\* cited by examiner

WEBBING ADJUSTMENT DEVICE FOR A SEAT BELT SYSTEM

BACKGROUND OF THE INVENTION

1. Field of the Invention

The present invention relates to a webbing adjustment device, and more particularly to a webbing adjustment device to adjust a height of an upper area of a three-point seat belt system.

2. Description of Related Art

A seat belt system is applied on a motor vehicle for protecting every occupant in the vehicle. A retractor of the seat belt system is mounted on a support pillar in the vehicle. A webbing of the seat belt system is pulled out from the retractor of the seat belt system. The webbing of the seat belt system is passed through a guiding ring of the seat belt system, and then the webbing is obliquely passed the front of the occupant's torso. A tongue mounted around the webbing is inserted into a buckle mounted on a seat of the vehicle. A triangular protection area can be formed by the webbing among the guiding ring, the buckle receiving tongue, and the retractor for the vehicle in use. The seat belt system is a three-point seat belt system. The body of the occupant in the vehicle is restrained on the seat in the vehicle by the webbing.

In a conventional three-point seat belt system, when the seat belt is fastened tightly, the height of the webbing near the shoulder of the occupant cannot be adjusted. In emergency, the neck of the occupant may be slashed by the webbing. Therefore, with increasing awareness on vehicle safety, a height adjustment device for the webbing of the seat belt system is necessary.

A conventional height adjustment device for the webbing of the seat belt system is adapted to a specific vehicle and has some defects, such as complex structure, short range of adjustment, multi-step adjustment, and complicated operation. Thus, it is necessary to invent a simplified, convenient, and useful height adjustment device to adjust the height of the webbing near the shoulder of the occupant in the vehicle.

To overcome the shortcomings, the present invention provides a webbing adjustment device for a seat belt system to mitigate or obviate the aforementioned problems.

SUMMARY OF THE INVENTION

The objective of the invention is to provide a webbing adjustment device that can be adjusted steplessly, reduces the production cost and the assembly cost of the webbing adjustment device, locks automatically, and is easy to operate.

The webbing adjustment device has a frame and a slider. The frame has a first hole and a second hole. The first hole is formed through the frame. The second hole is formed through the frame below the first hole of the frame. A front section of a seat belt webbing extends through the second hole of the frame. The slider is detachably connected to the frame. The slider has a first end portion, a second end portion, a connecting portion, and a through groove. The first end portion is formed on the slider. The second end portion is formed on the slider and is opposite to the first end portion of the slider. The connecting portion is formed on the slider between the first end portion and the second end portion of the slider, and the connecting portion has a top surface and a bottom surface. The through groove is formed through the connecting portion from the top surface of the connecting portion to the bottom surface of the connecting portion. The connecting portion of the slider is inserted through the first hole of the frame, and a rear section of the webbing is passed through the first hole of the frame and the through groove of the slider, and the rear section of the webbing is locked or unlocked by a relative motion between the frame and the slider.

The webbing adjustment device is mounted on a webbing of a seat belt system. The webbing adjustment device is below a guiding ring of the seat belt system. The webbing adjustment device is located between a front section of the webbing and a rear section of the webbing. The rear section of the webbing is passed through the webbing adjustment device. The webbing adjustment device is connected to the front section of the webbing. A positioning point of the webbing near the guiding ring is restricted by the webbing adjustment device for protecting the user's neck from slashing by the webbing. A height of the positioning point of the webbing is adjusted by the webbing adjustment device. The relative motion between the frame and the slider is generated to unlock the webbing. The webbing adjustment device may be moved upward or downward to a suitable position. When the occupant stop moving the webbing adjustment device, the webbing adjustment device locks the webbing automatically by the tension of the webbing, ensuring that the positioning point of the webbing is close to the height of the shoulder of the user.

The webbing adjustment device is adapted to various types of vehicles. The webbing adjustment device is simplified in structure, easy in operation, and cost-effective in manufacture and assembly. The webbing adjustment device can be adjusted steplessly. The adjustment range of the webbing adjustment device is long. The webbing adjustment device is easy to operate and automatically locks the webbing.

The webbing adjustment device further has a cover. The cover is moveably mounted on the frame. Two side edges of the frame are inserted into two slide grooves of the cover respectively. A stop portion of the cover is mounted above the first end portion of the slider. The user adjusts the cover to adjust the height of the positioning point of the webbing adjustment device.

Other objectives, advantages and novel features of the invention will become more apparent from the following detailed description when taken in conjunction with the accompanying drawings.

Figure 1:
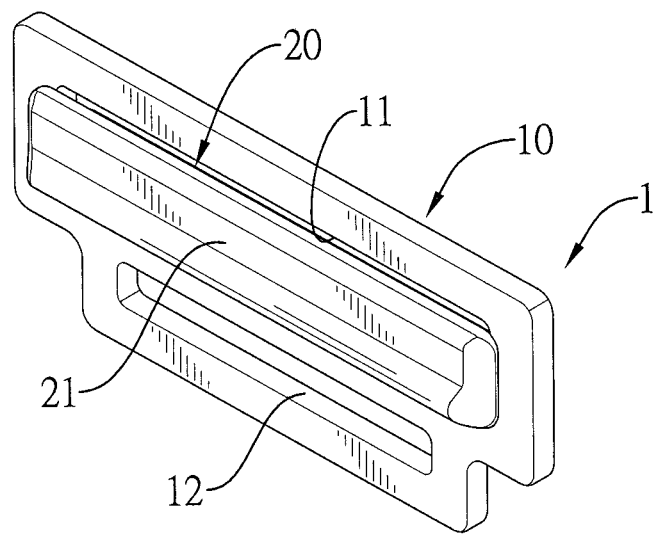
FIG. 1 is a perspective view of a first embodiment of a webbing adjustment device for a seat belt system in accordance with the present invention.
Figure 2:
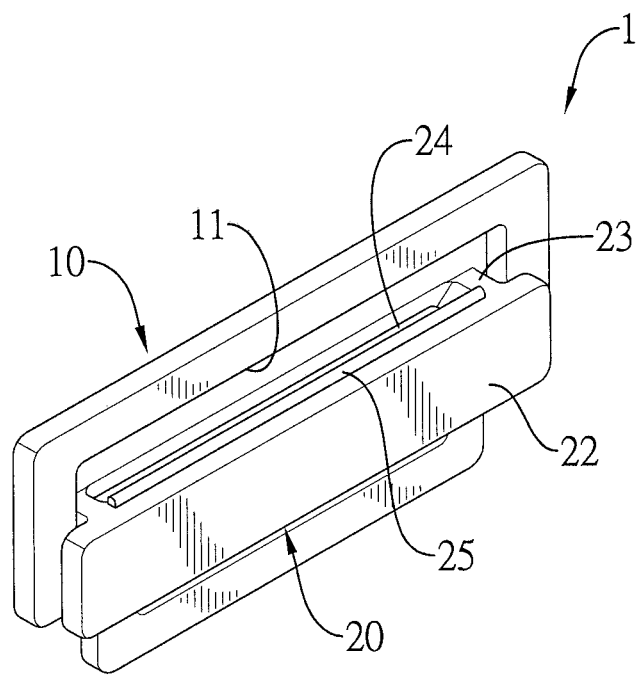
FIG. 2 is another perspective view of the webbing adjustment device in FIG. 1.
Figure 3:
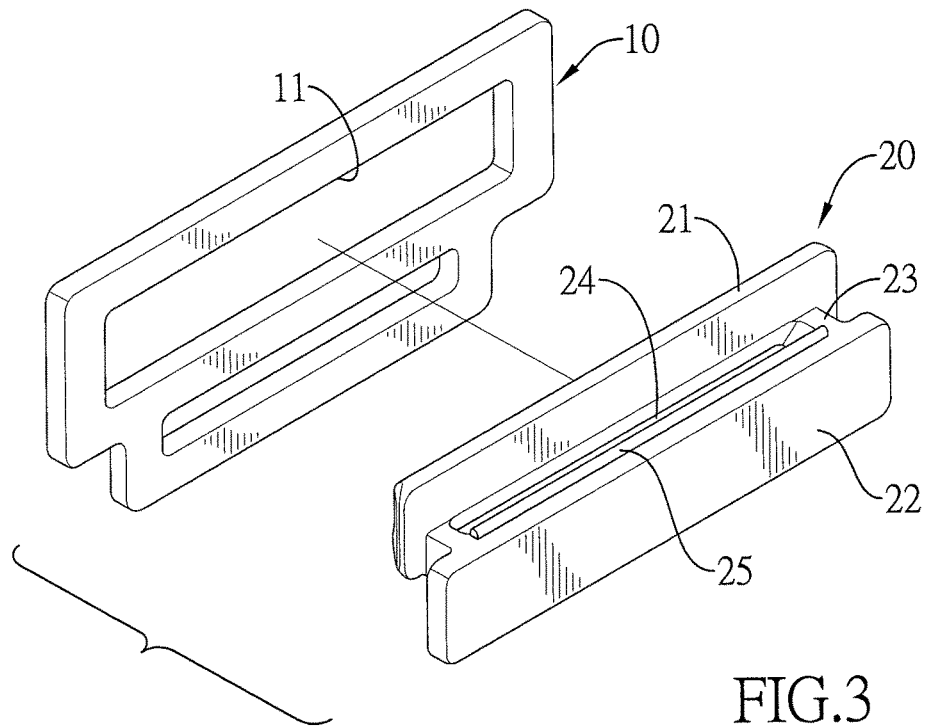
FIG. 3 is an exploded perspective view of the webbing adjustment device in FIG. 1.
Figure 4:
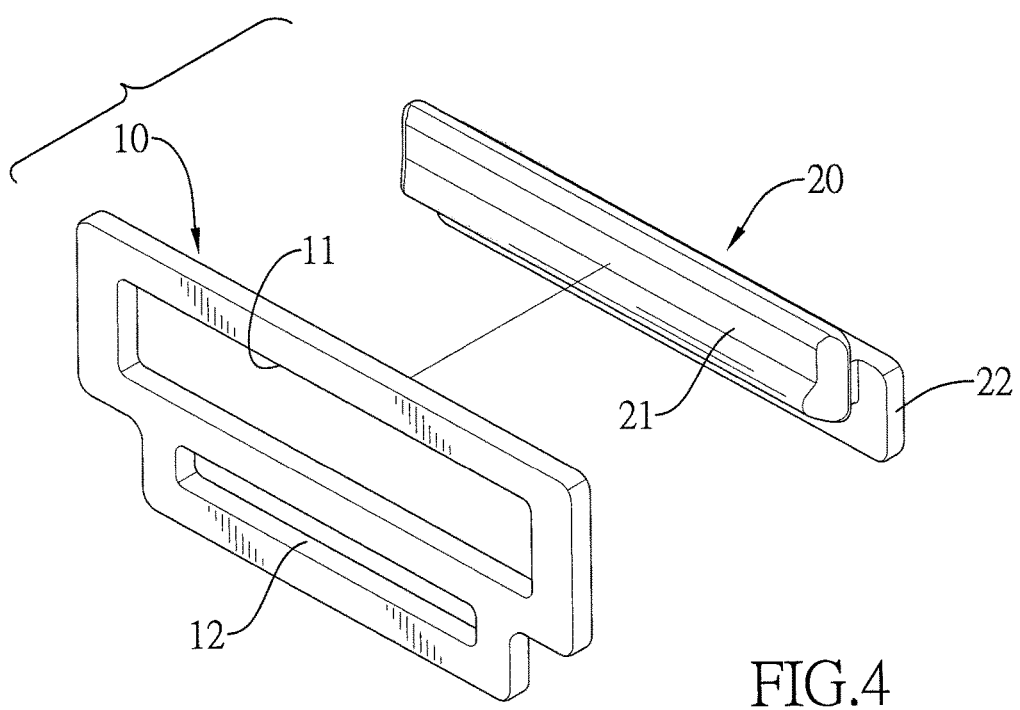
FIG. 4 is another exploded perspective view of the webbing adjustment device in FIG. 1.
Figure 8:
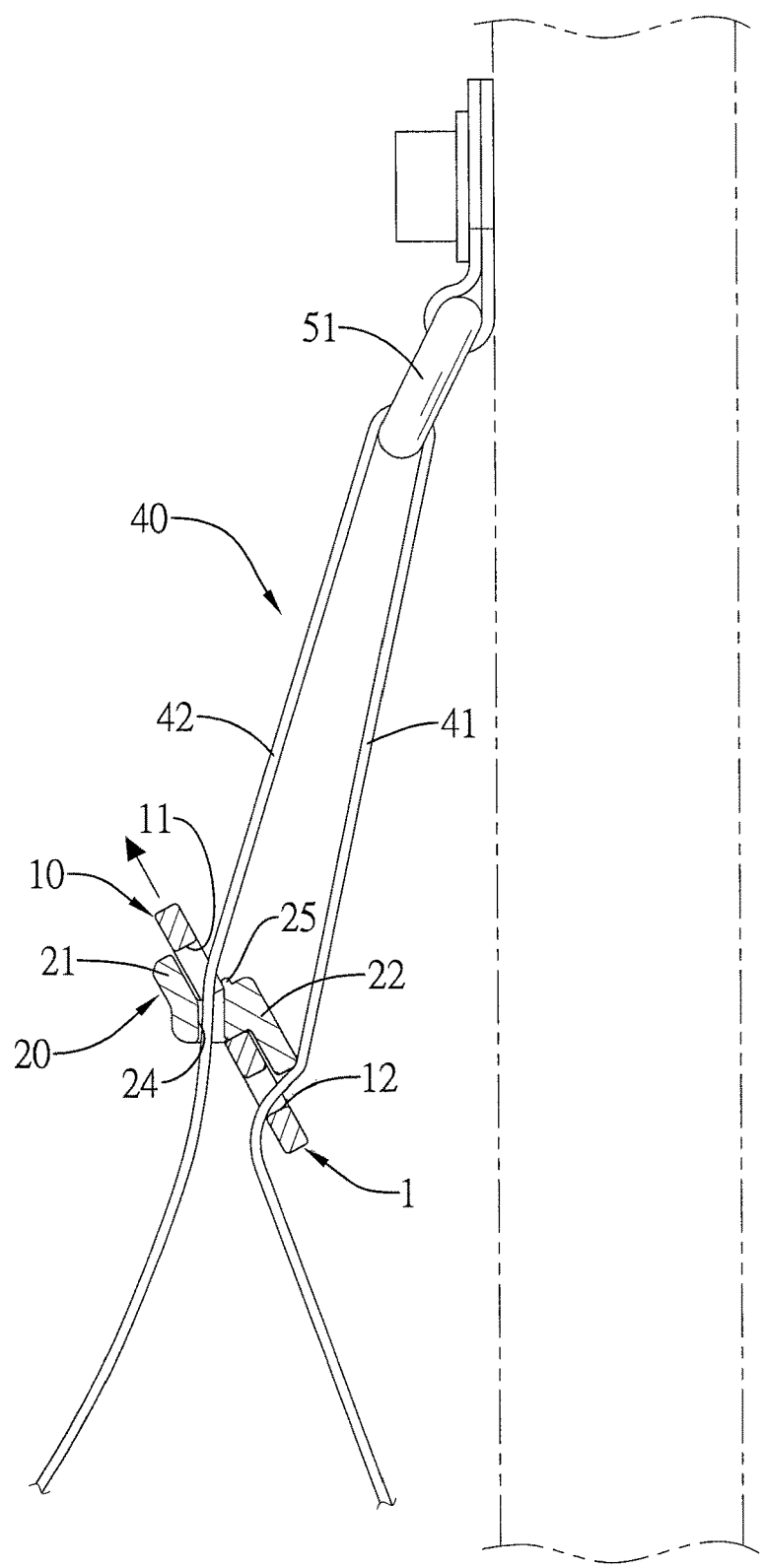
Figure 9:
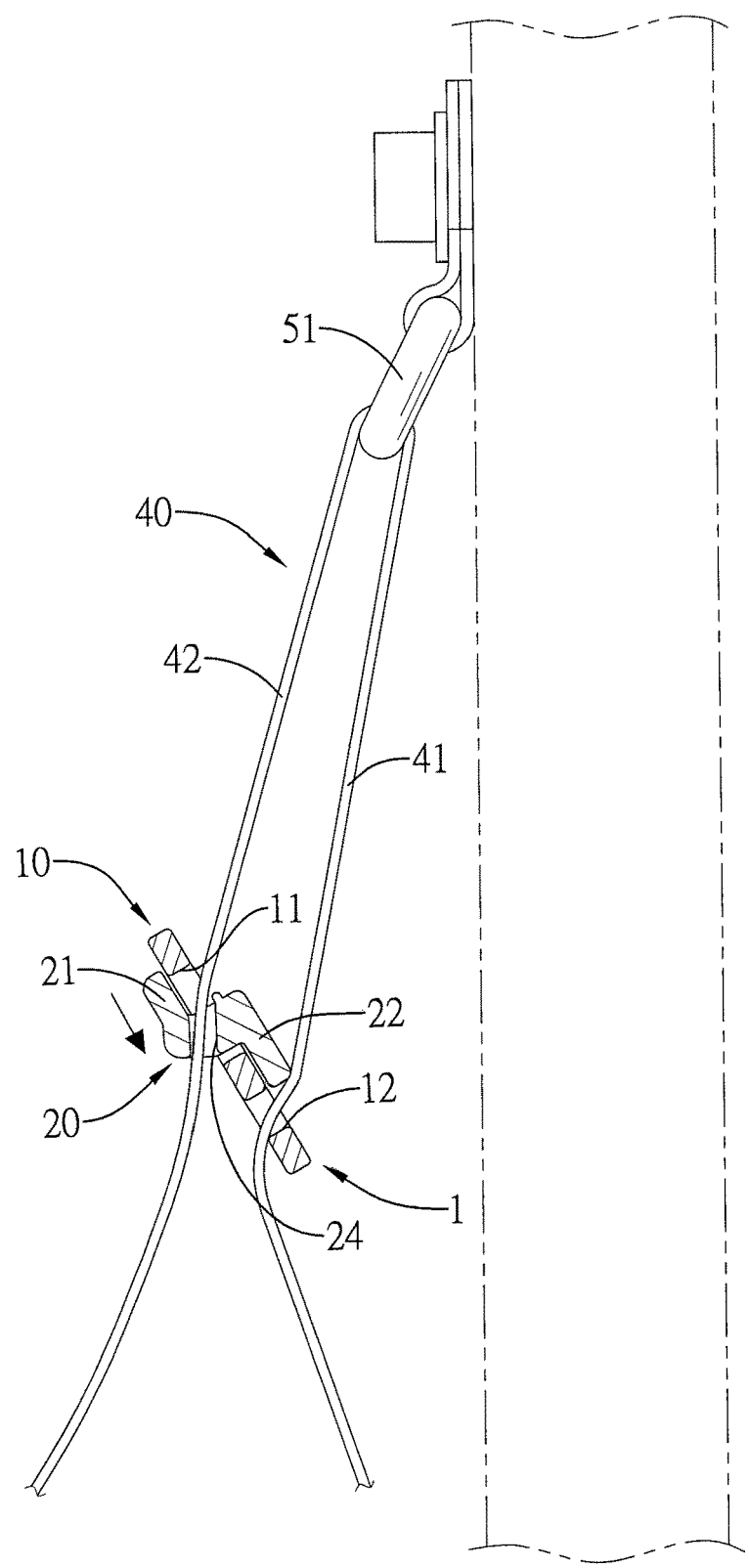
Figure 10:
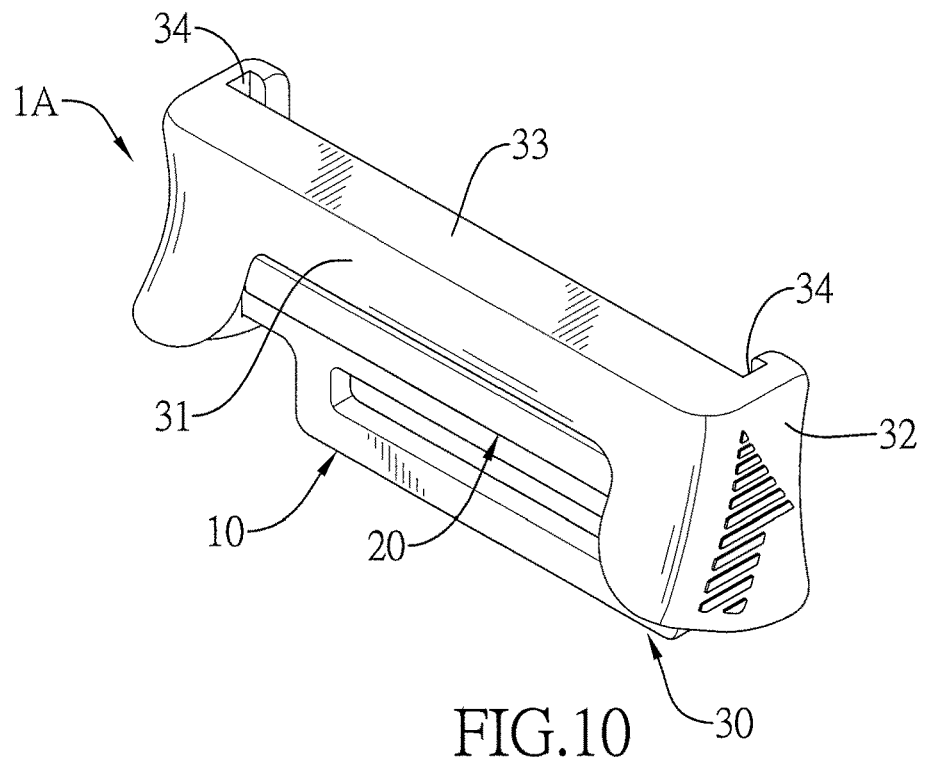
Figure 11:
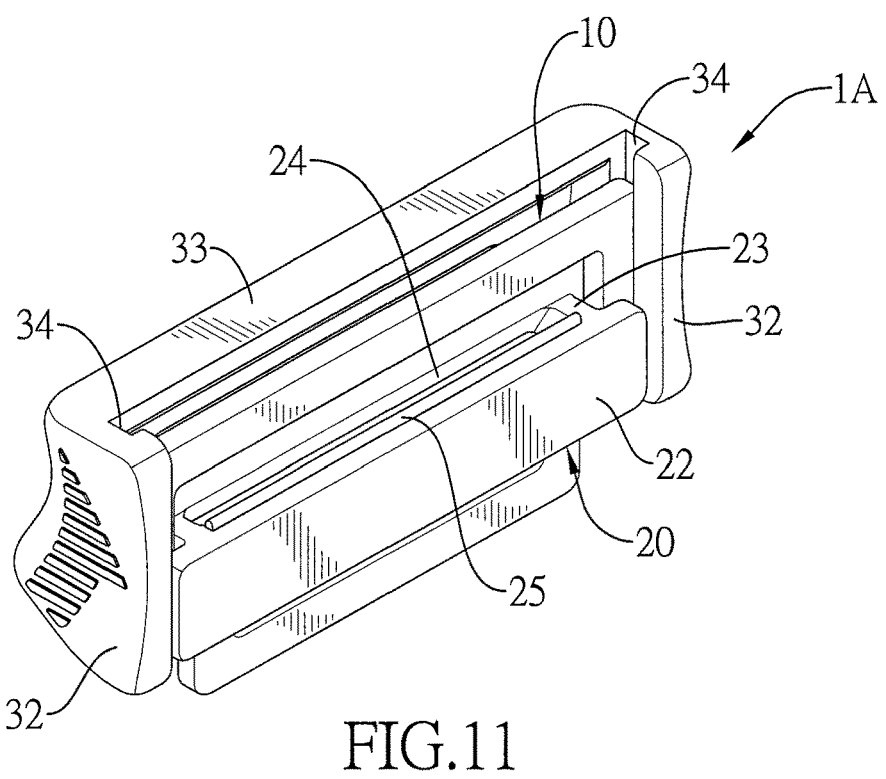
Figure 12:
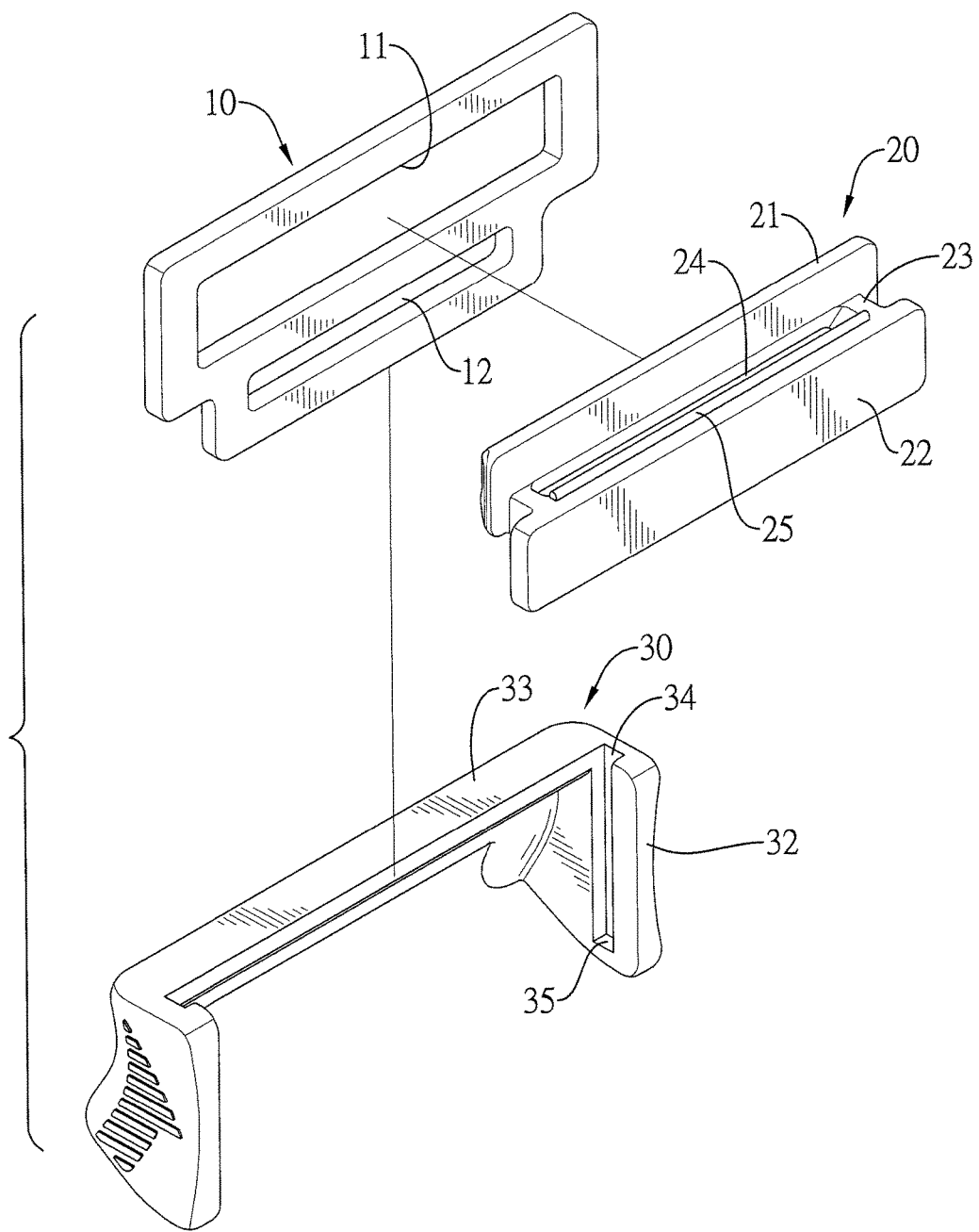
Figure 13:
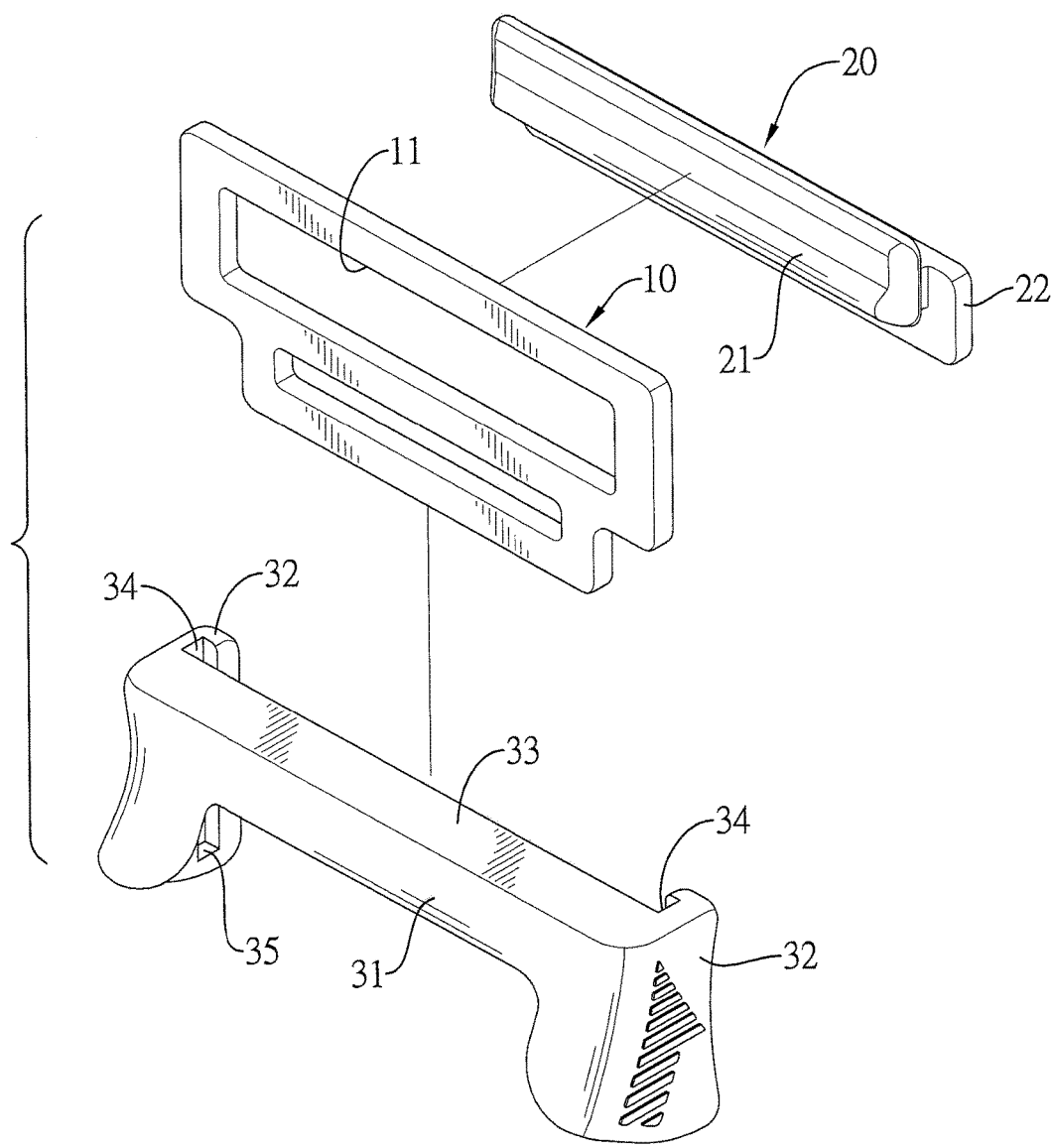
Figure 14:
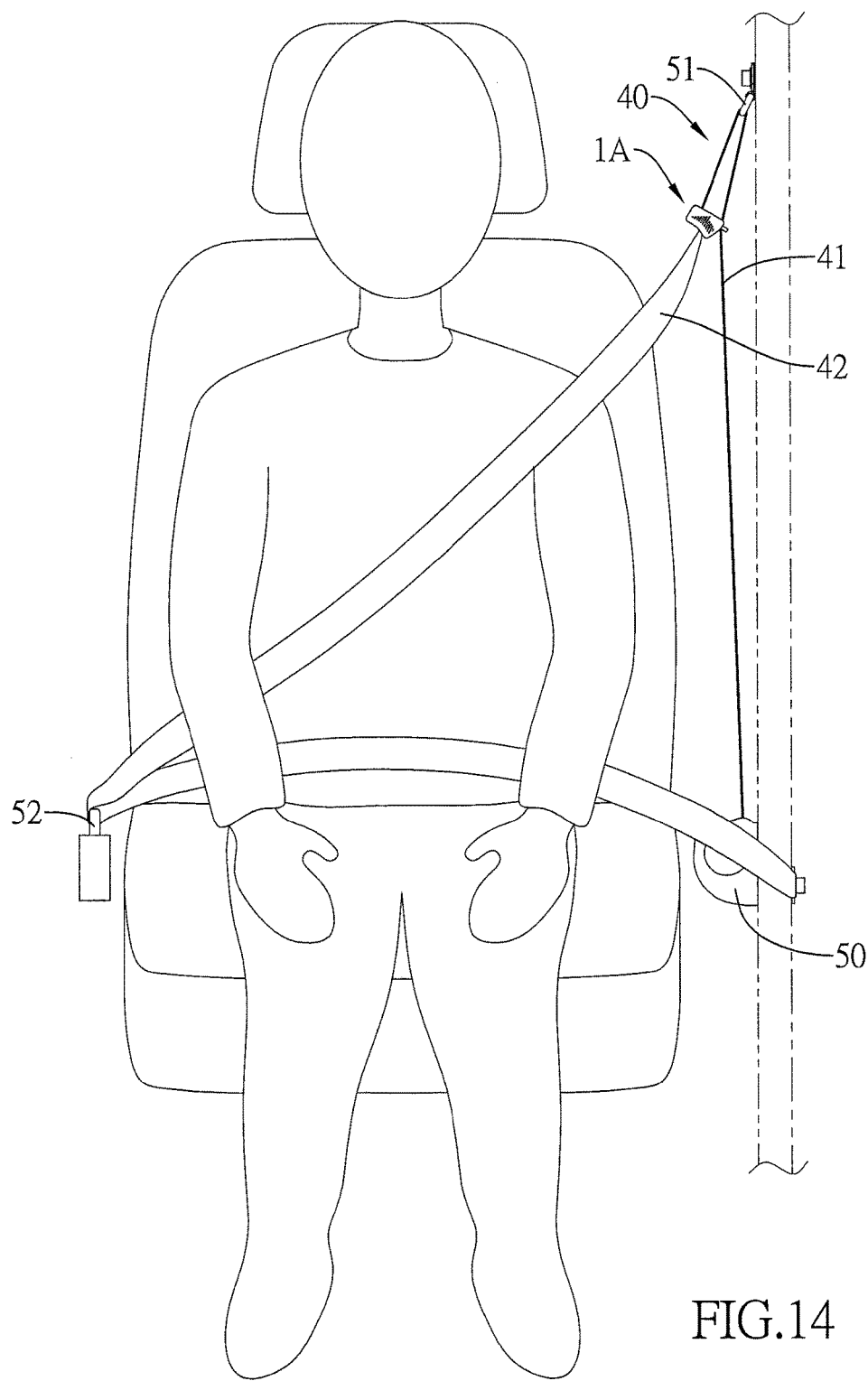
Figure 15:
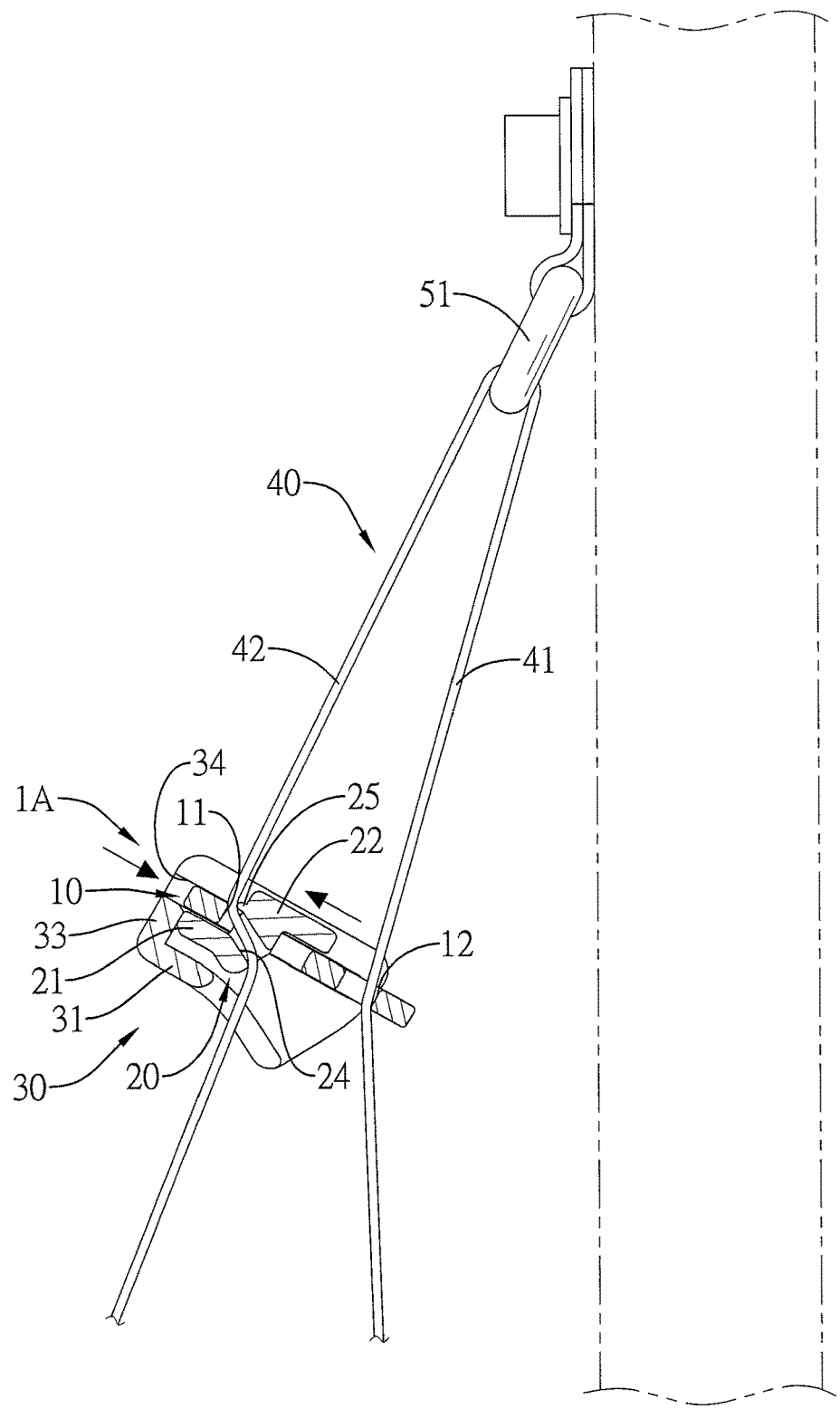
Figure 16:
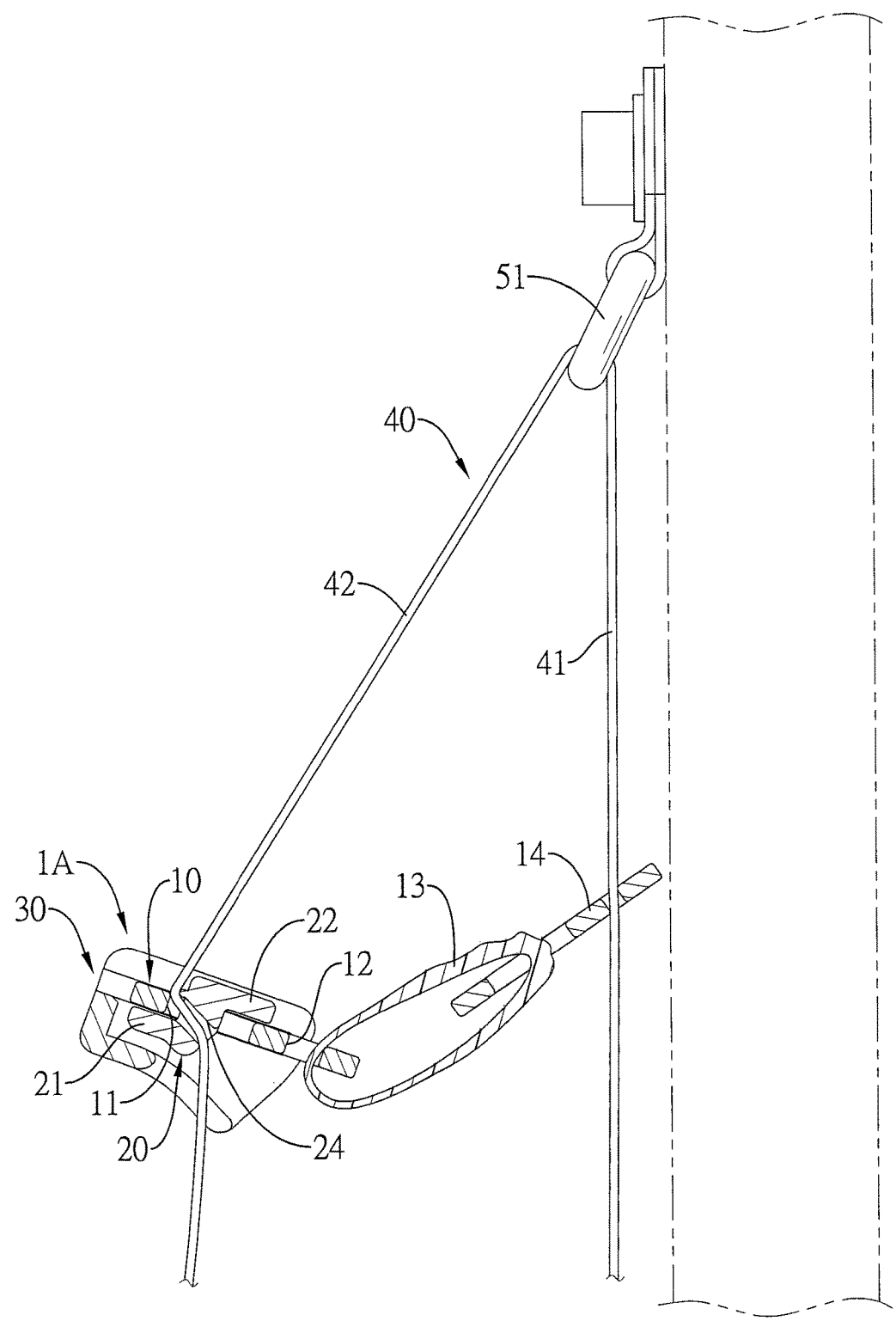
Figure 17:
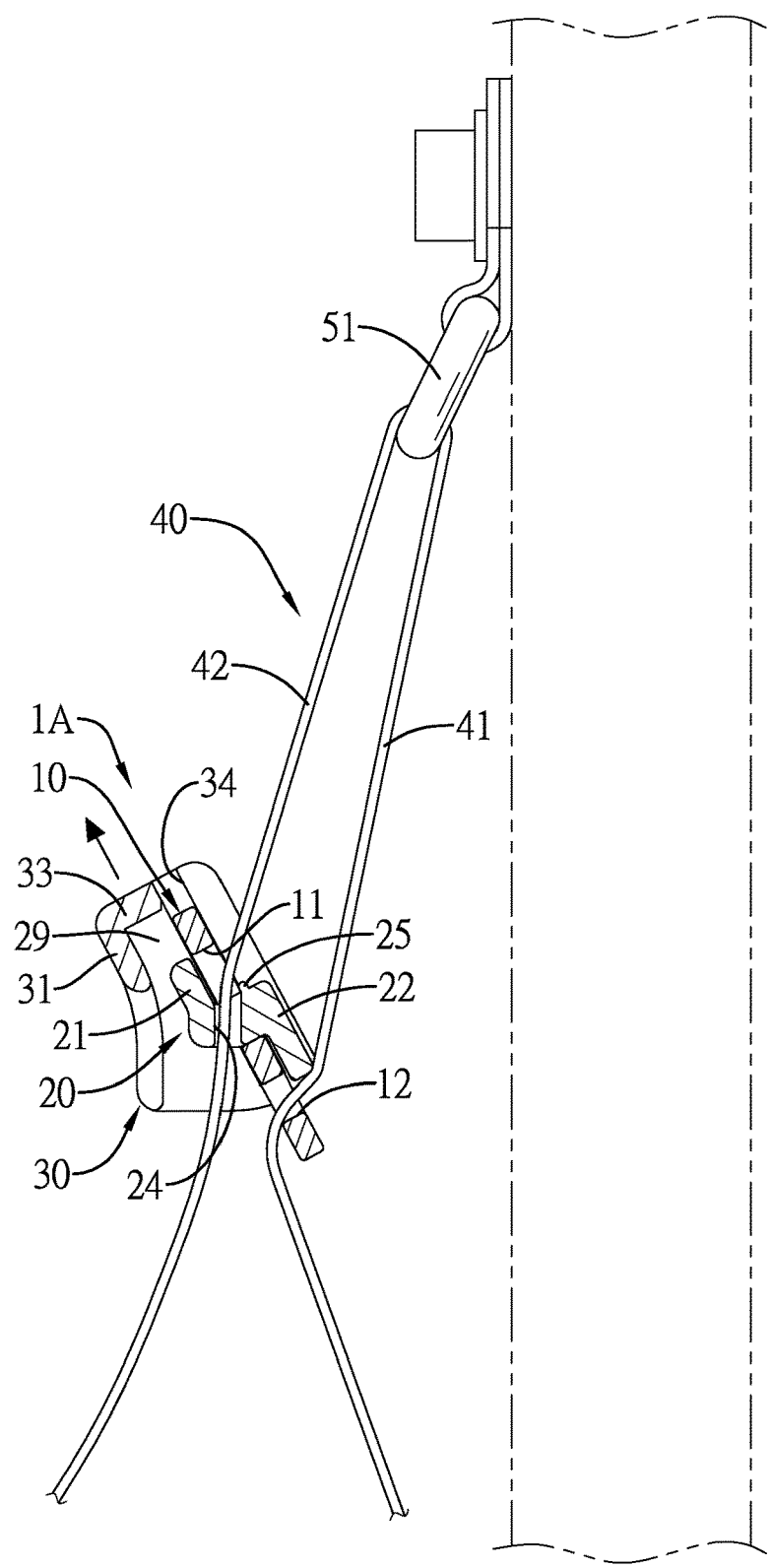
Figure 18:
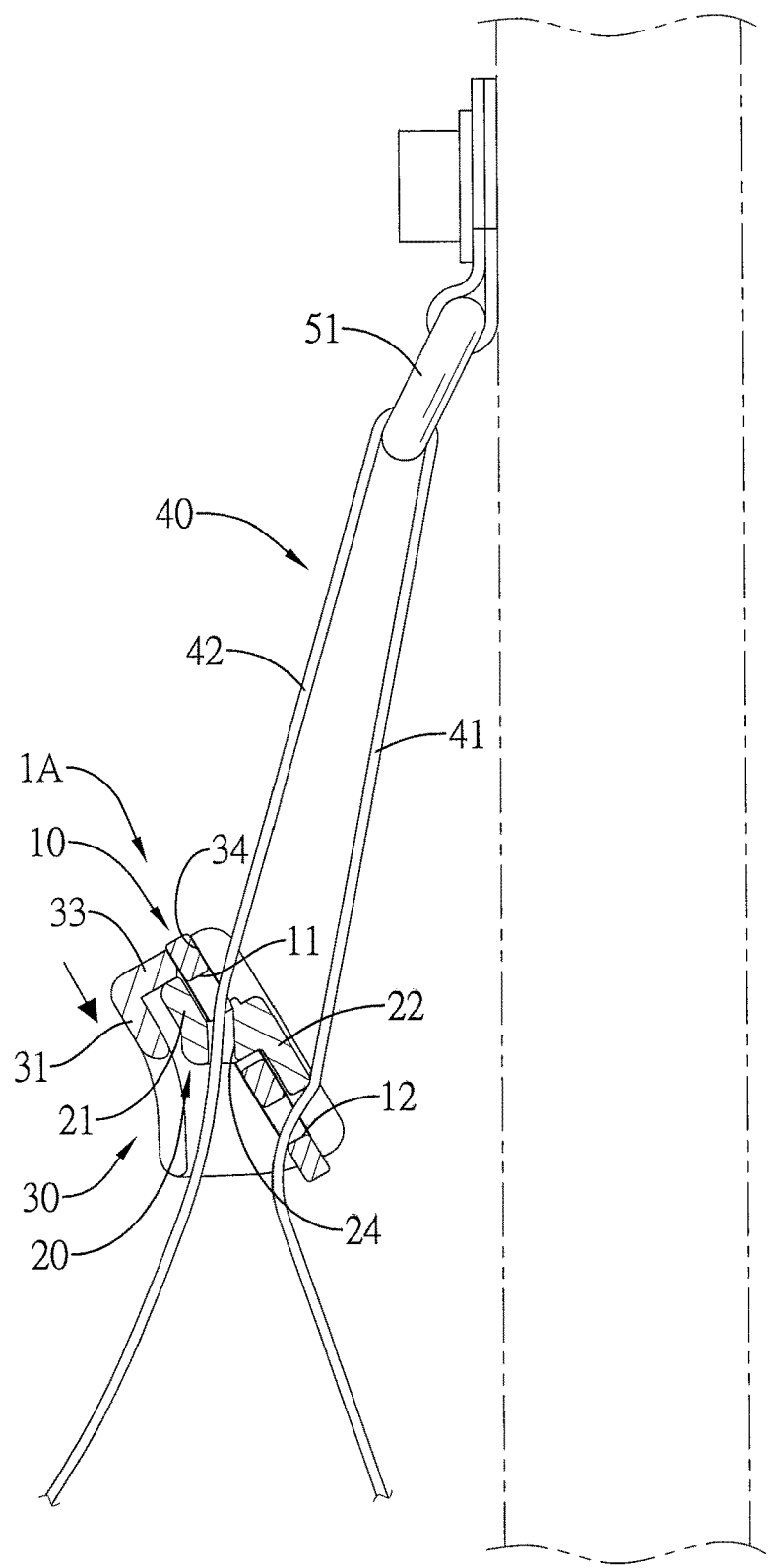
Figure 19:
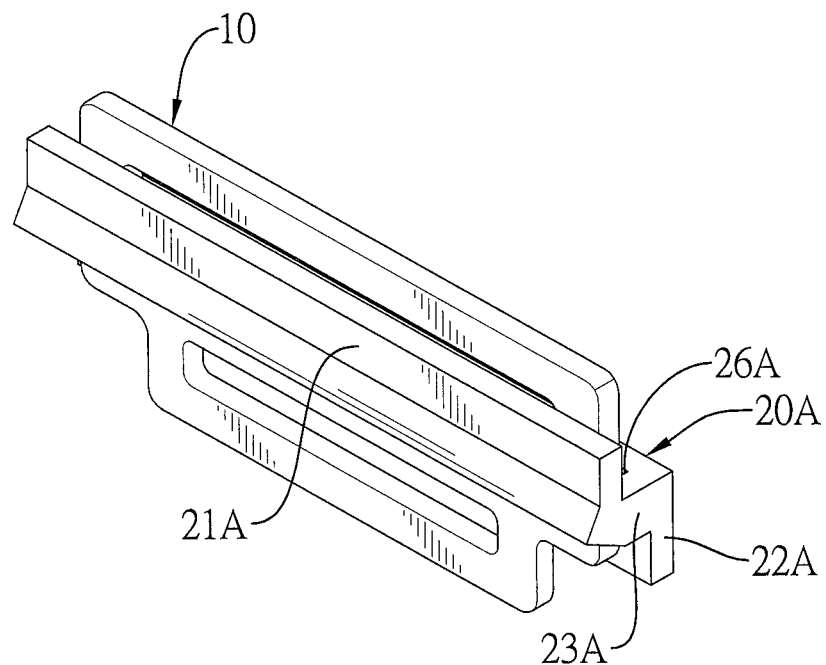
Figure 20:
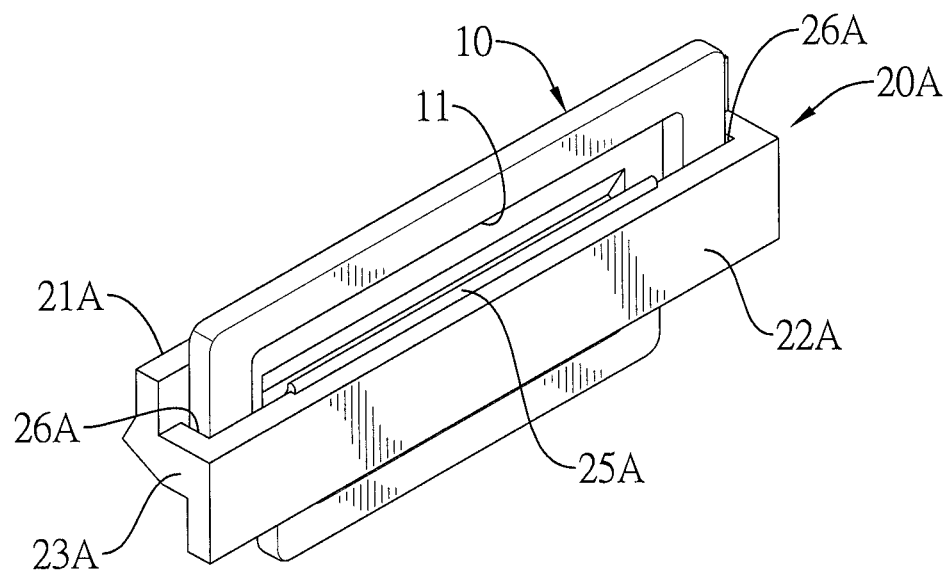
Figure 21:
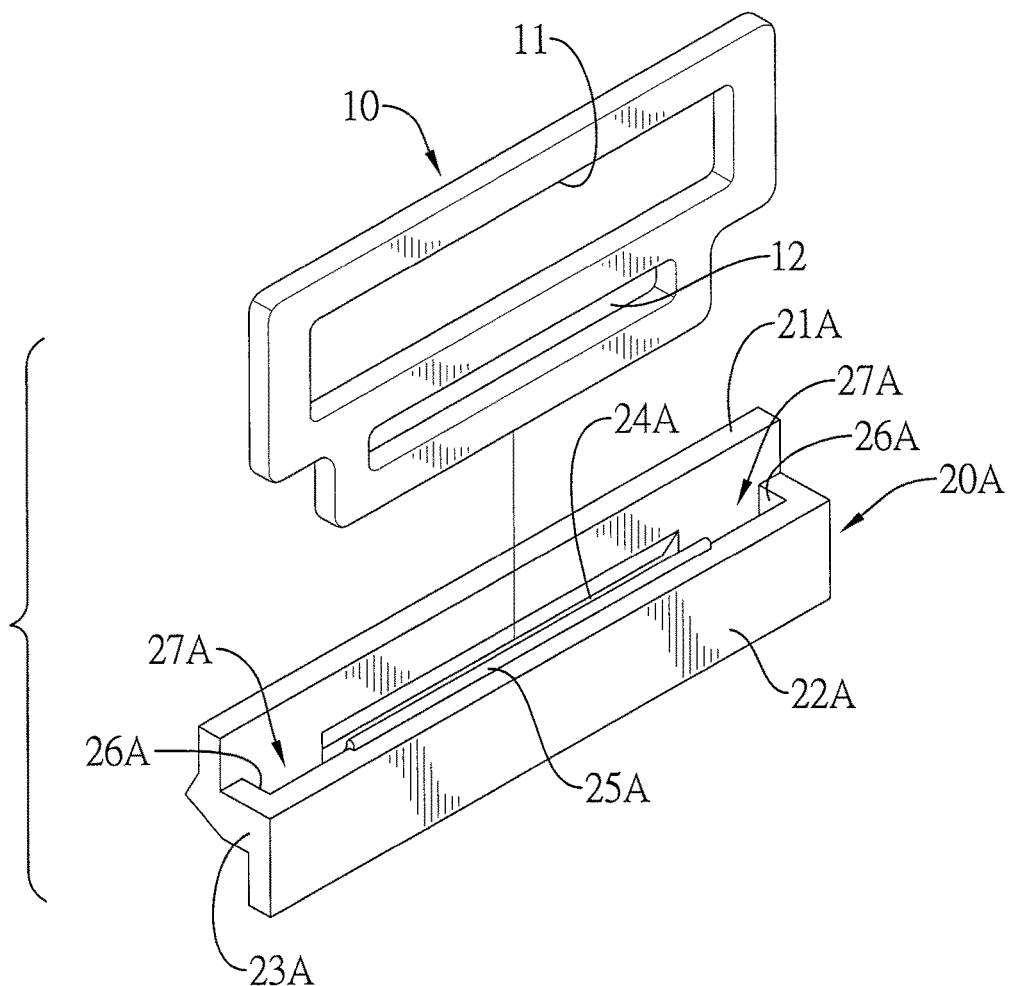
Figure 22:
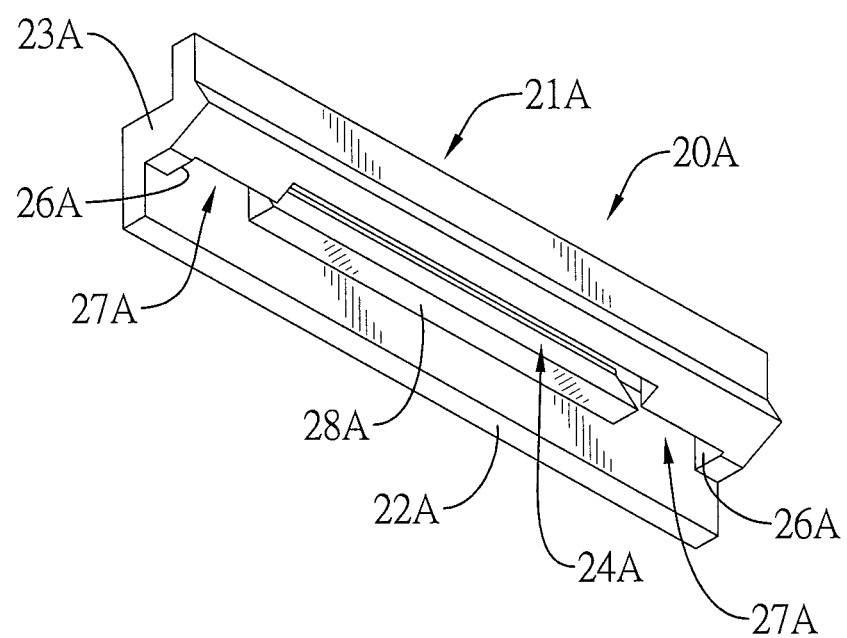
Figure 23:
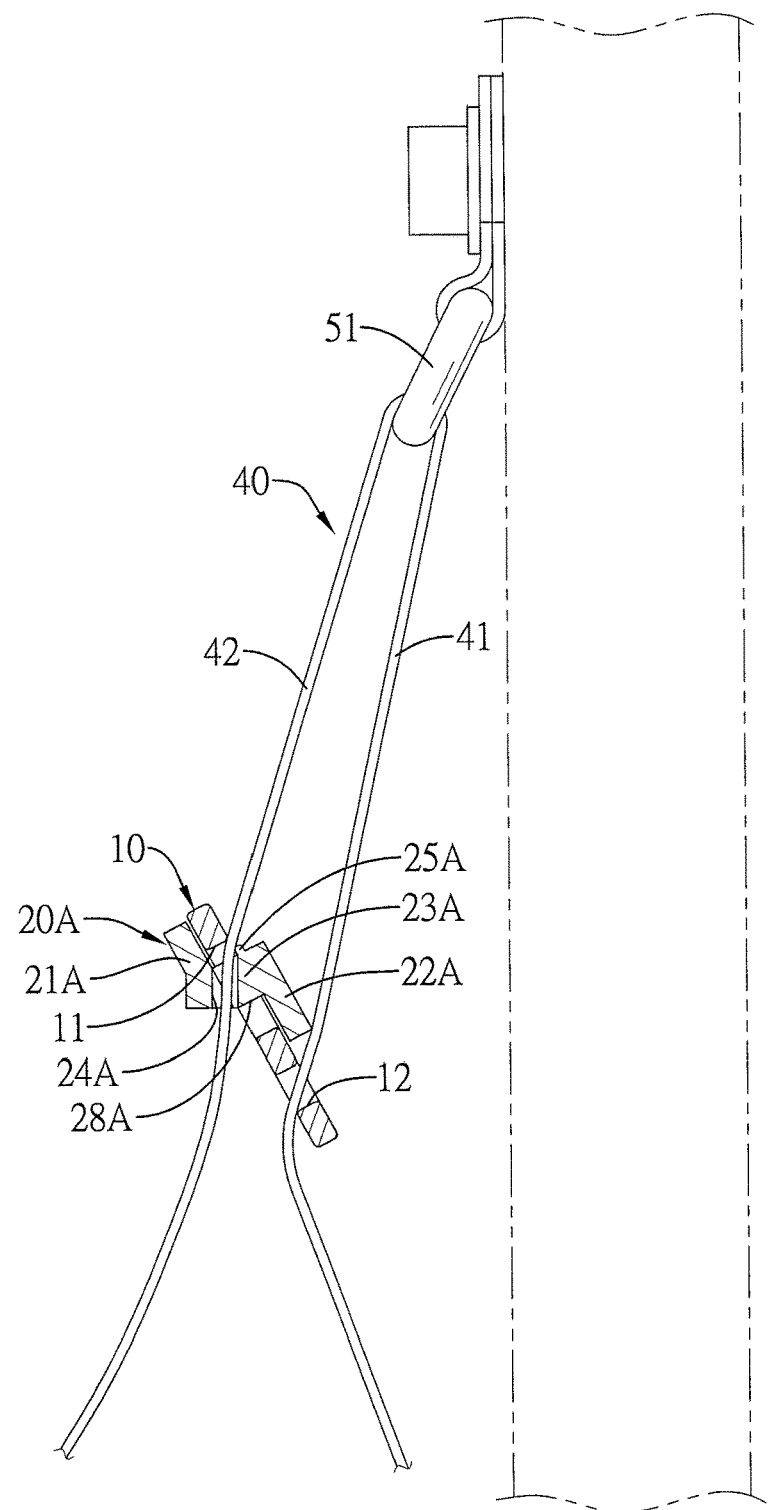
Figure 24:
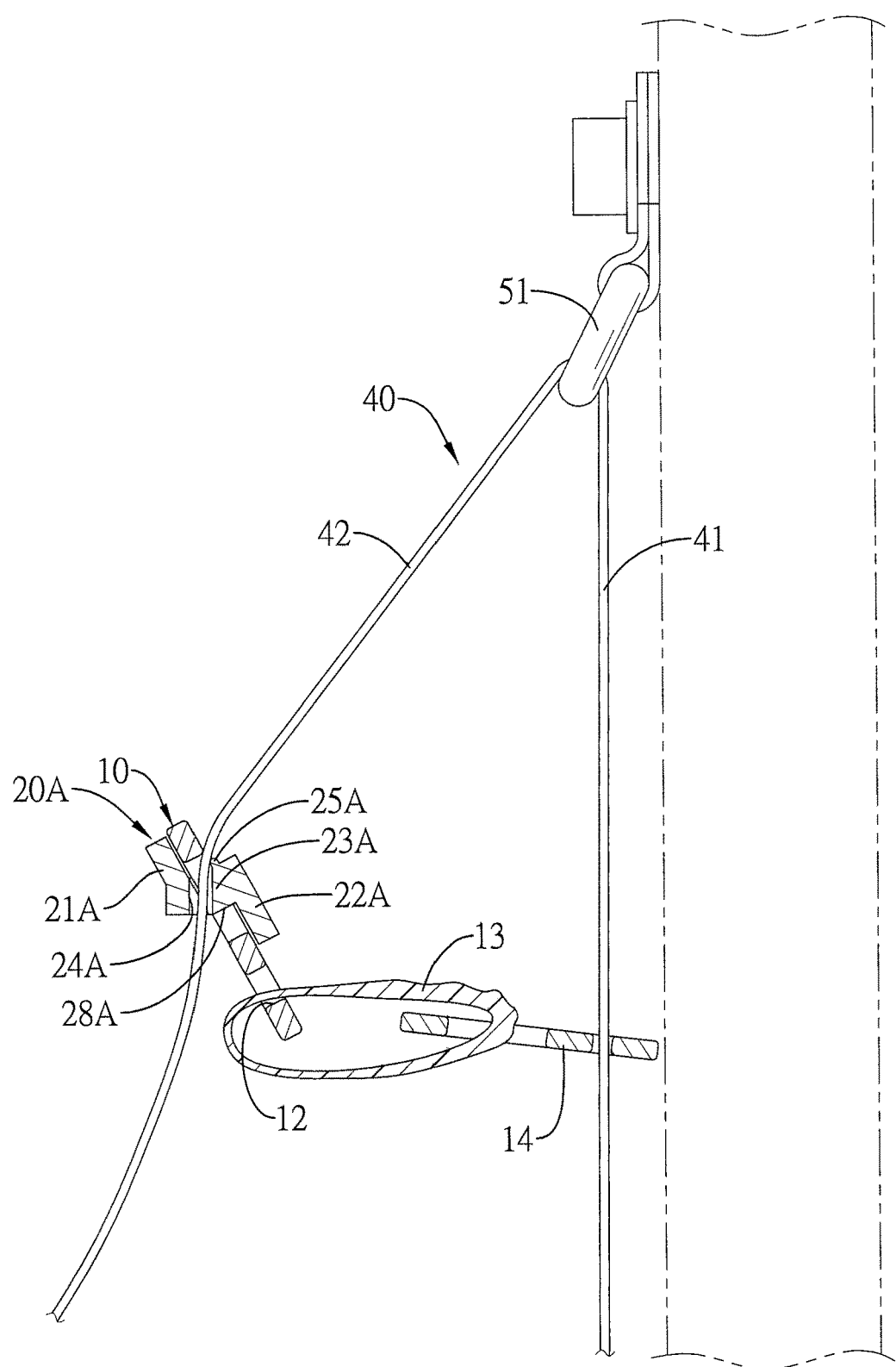

FIG. 8 is an operational front side view in partial section of the webbing adjustment device in FIGS. 1 and 2, showing the frame moves upwardly relative to a slider of the webbing adjustment device;

FIG. 9 is an operational front side view in partial section of the webbing adjustment device in FIGS. 1 and 2, showing the slider moves downwardly relative to the frame of the webbing adjustment device;

FIG. 10 is a perspective view of a second embodiment of a webbing adjustment device for a seat belt system in accordance with the present invention;

FIG. 11 is another perspective view of the second embodiment of the webbing adjustment device in FIG. 10;

FIG. 12 is an exploded perspective view of the second embodiment of the webbing adjustment device in FIGS. 10 and 11;

FIG. 13 is another exploded perspective view of the second embodiment of the webbing adjustment device in FIGS. 10 and 11;

FIG. 14 is an operational front side view of the second embodiment of the webbing adjustment device in FIGS. 10 and 11, showing the webbing adjustment device is mounted on the seat belt system;

FIG. 15 is an enlarged and operational front side view in partial section of the second embodiment of the webbing adjustment device in FIG. 14;

FIG. 16 is an enlarged and operational front side view in partial section of the second embodiment of the webbing adjustment device in FIGS. 10 and 11, showing the frame of the webbing adjustment device is connected to the connecting strap and the connecting element;

FIG. 17 is an operational front side view in partial section of the second embodiment of the webbing adjustment device in FIGS. 10 and 11, showing a cover of the webbing adjustment device moves upwardly;

FIG. 18 is an operational front side view in partial section of the second embodiment of the webbing adjustment device in FIGS. 10 and 11, showing the cover of the webbing adjustment device moves downwardly;

FIG. 19 is a perspective view of a third embodiment of a webbing adjustment device for a seat belt system in accordance with the present invention;

FIG. 20 is another perspective view of the third embodiment of the webbing adjustment device in FIG. 19;

FIG. 21 is an exploded perspective view of the third embodiment of the webbing adjustment device in FIGS. 19 and 20;

FIG. 22 is a bottom perspective view of the slider of the third embodiment of the webbing adjustment device in FIGS. 19 and 20;

FIG. 23 is an enlarged and operational front side view in partial section of the third embodiment of the webbing adjustment device in FIGS. 19 and 20, showing the webbing adjustment device is assembled on the seat belt system; and FIG. 24 is an enlarged and operational front side view in partial section of the third embodiment of the webbing adjustment device in FIGS. 19 and 20, showing the frame of the webbing adjustment device is connected to the connecting strap and the connecting element.

DETAILED DESCRIPTION OF THE PREFERRED EMBODIMENT

With reference to FIGS. 1 to 4, a first embodiment of a webbing adjustment device 1 for a seat belt system in accordance with the present invention comprises a frame 10 and a slider 20.

Figure 5:
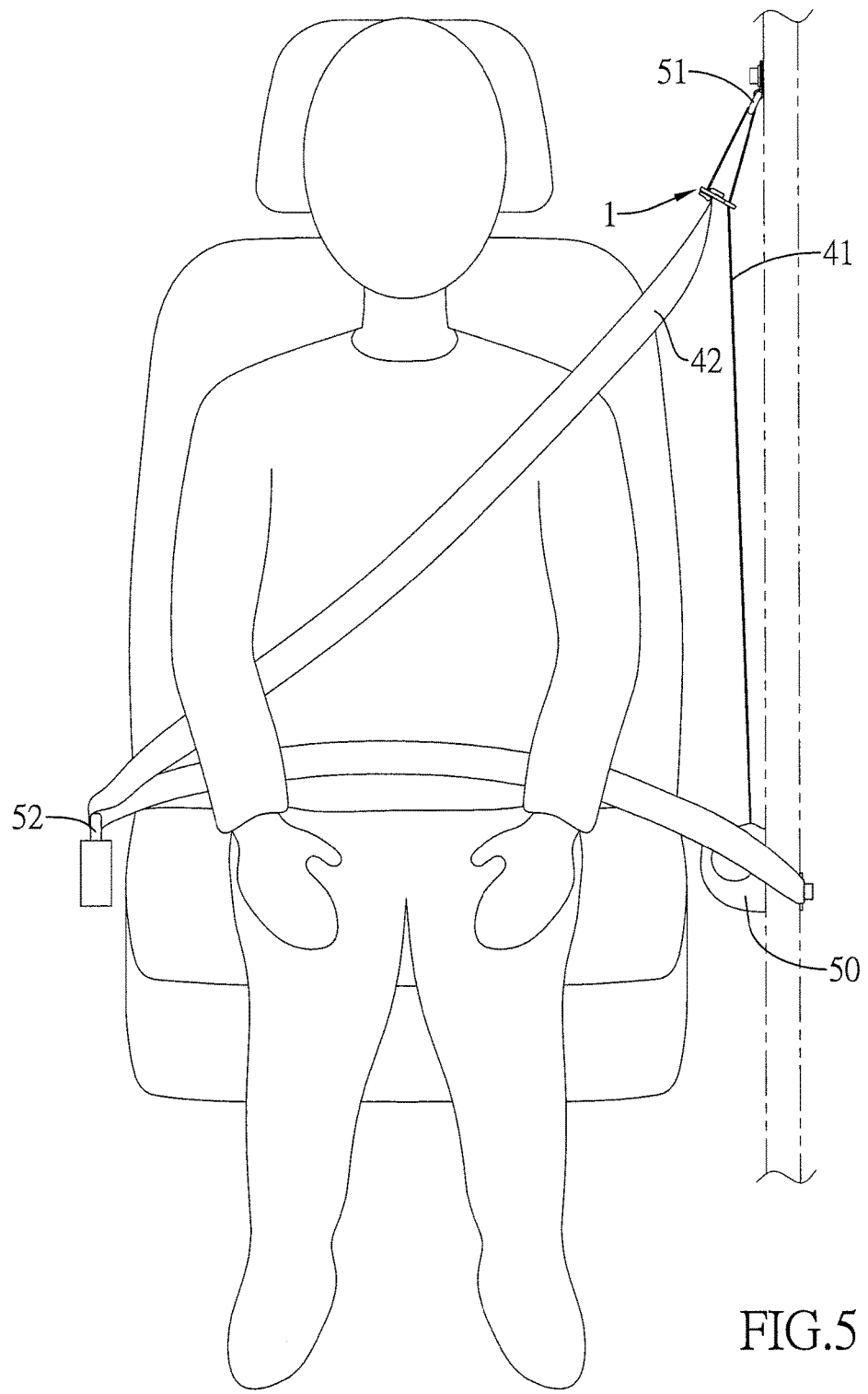
FIG. 5 is an operational front side view of the webbing adjustment device in FIGS. 1 and 2, showing the webbing adjustment device is assembled on the seat belt system.
Figure 6:
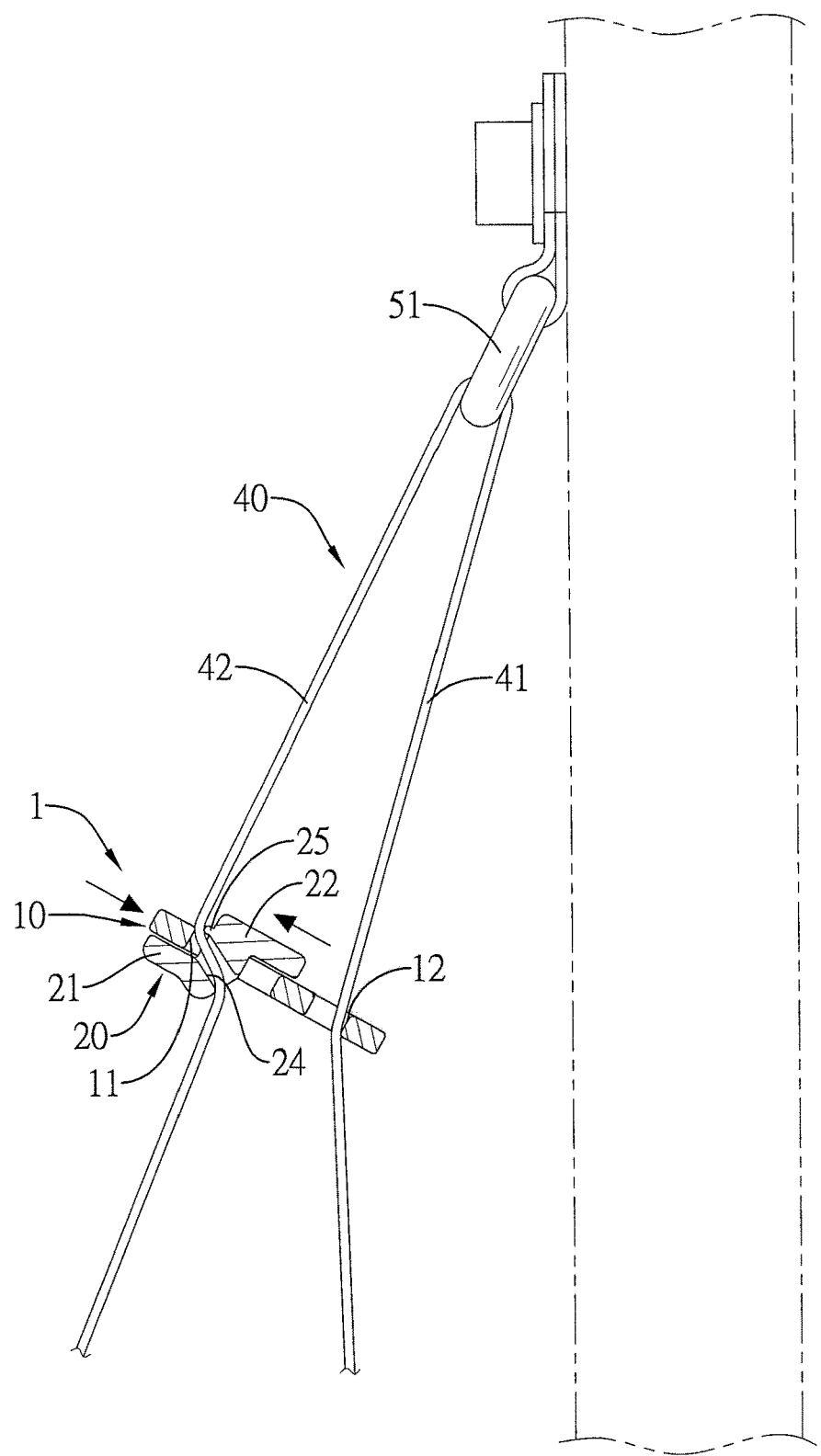
FIG. 6 is an enlarged and operational front side view in partial section of the webbing adjustment device in FIG. 5.

The frame 10 has a first hole 11 and a second hole 12. The first hole 11 is formed through the frame 10. The second hole 12 is formed through the frame 10 below the first hole 11 of the frame 10. With reference to FIGS. 5 and 6, a front section 41 of a webbing 40 extends through the second hole 12 of the frame 10.

The slider 20 is detachably connected to the frame 10 and has a first end portion 21, a second end portion 22, a connecting portion 23, and a through groove 24. The first end portion 21 is formed on the slider 20. The second end portion 22 is formed on the slider 20 and is opposite to the first end portion 21 of the slider 20. The connecting portion 23 is formed on the slider 20 between the first end portion 21 and the second end portion 22 of the slider 20. The connecting portion 23 has a top surface and a bottom surface. The through groove 24 is formed through the connecting portion 23 from the top surface of the connecting portion 23 to the bottom surface of the connecting portion 23. With reference to FIGS. 5 and 6, the connecting portion 23 of the slider 20 is inserted through the first hole 11 of the frame 10. A rear section 42 of the webbing 40 is passed through the first hole 11 of the frame 10 and the through groove 24 of the slider 20, and the rear section 42 of the webbing 40 is locked or unlocked by a relative motion between the frame 10 and the slider 20. The first hole 11 and the second hole 12 of the frame 10 are closed-type holes or open-type holes. The through groove 24 of the slider 20 is a closed-type groove or an open-type groove. When the first hole 11 and the second hole 12 of the frame 10 are open-type holes, a first slit is formed through an outer surface of the frame 10 and is in communication with the first hole 11, and a second slit (not shown) is formed through the outer surface of the frame 10 and is in communication with the second hole 12. The webbing 40 is inserted into the first hole 11 via the first slit and is inserted into the second hole 12 via the second slit. When the through groove 24 of the slider 20 is an open-type groove, a third slit (not shown) is formed through an outer surface of the slider 20 and is in communication with the through groove 24. The webbing 40 is inserted into the through groove 24 via the third slit. Therefore, the webbing adjustment device 1 can be easily assembled with the webbing 40 by a user.

With reference to FIGS. 1 to 4, the first end portion 21 and the second end portion 22 are deviating vertically. The connecting portion 23 is formed between the bottom of the first end portion 21 and the top of the second end portion 22. The through groove 24 of the slider 20 is sloped from the top of the second end portion 22 toward the bottom of the first end portion 21. A flange 25 is formed on the top of the second end portion 22 adjacent to the through groove 24.

With reference to FIGS. 5 and 6, the webbing adjustment device 1 is mounted on the webbing of the seat belt system. The webbing adjustment device 1 is connected between the front section 41 of the webbing 40 and the rear section 42 of the webbing 40 below a guiding ring 51 of the seat belt system. A section of the webbing 40 between a retractor 50 of the seat belt system and the guiding ring 51 is defined as the front section 41. Another section of the webbing 40 between a tongue 52 of the seat belt system and the guiding ring 51 is defined as the rear section 42. The front section 41 is directly passed through the second hole 12 of the frame 10. When the second hole 12 is a closed-type hole, the front section 41 is directly inserted through the second hole 12 of the frame 10. When the second hole 12 is an open-type hole, the front section 41 is inserted through the second hole 12 of the frame 10 via the second slit.

Figure 7:
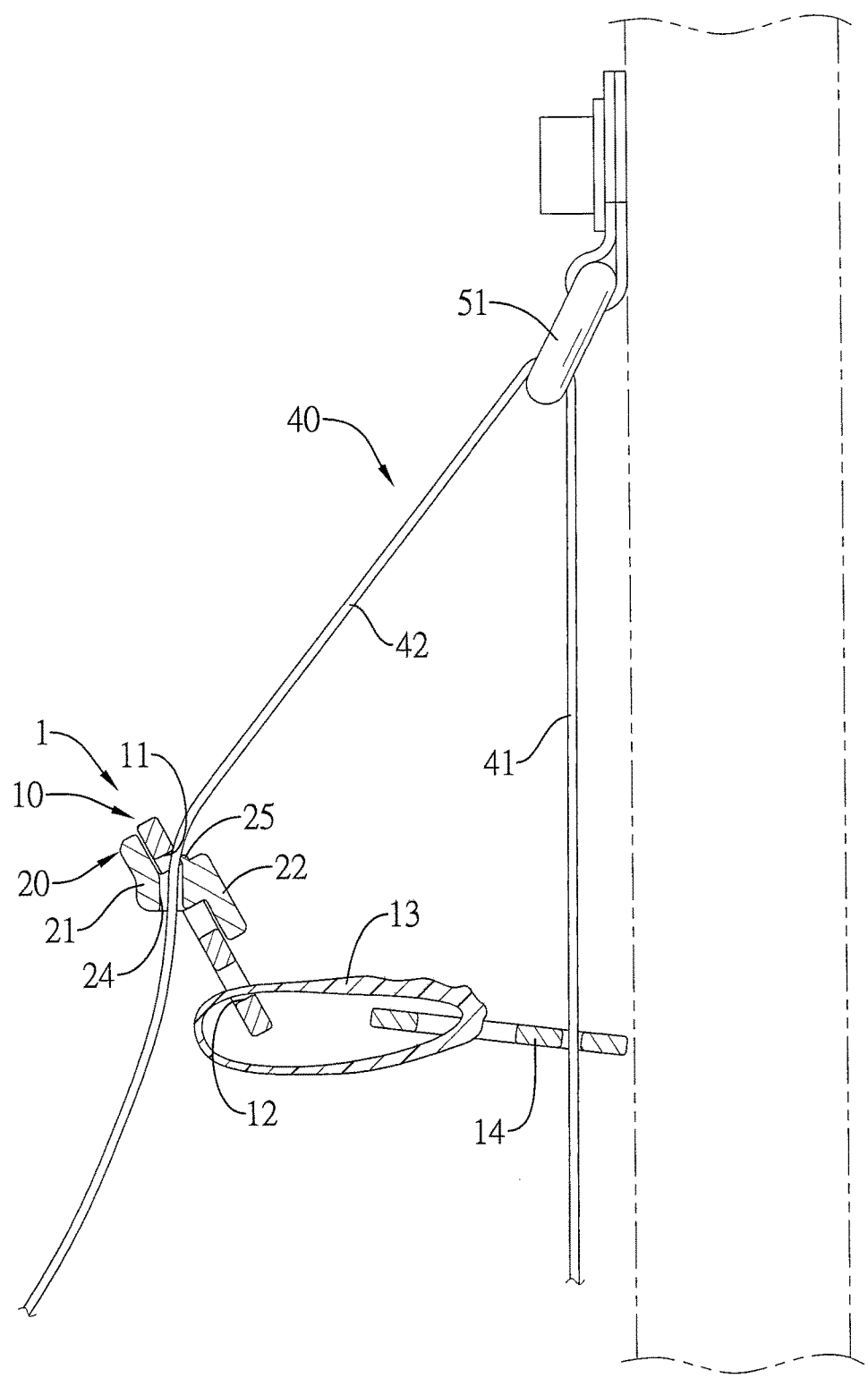
FIG. 7 is an enlarged and operational front side view in partial section of the webbing adjustment device in FIGS. 1 and 2, showing a frame of the webbing adjustment device is connected to a connecting strap and a connecting element.

With reference to FIG. 7, the frame 10 of the webbing adjustment device 1 further has a connecting strap 13 and a connecting element 14. The connecting strap 13 is connected to the frame 10 by extending through the second hole 12 of the frame 10. The connecting element 14 is connected to the connecting strap 13 and is connected to the front section 41 of the webbing 40. The connecting strap 13 may be an elastic strap, a flexible strap or an elastomeric strap, such as rubber.

The rear section 42 of the webbing 40 is inserted through the first hole 11 of the frame 10 and the through groove 24 of the slider 20 up to down. Besides, when the first hole 11 is an open-type hole, the rear section 42 is inserted through the first hole 11 of the frame 10 via the first slit and is inserted through the through groove 24 via the third slit. The rear section 42 is slantly passed through the frame 10 and the slider 20, and is located between the different sides of a top section of the frame 10 and a bottom section of the frame 10. The rear section 42 of the webbing 40 is locked or unlocked by the relative motion between the frame 10 and the slider 20. The webbing adjustment device 1 forms a positioning sliding point between the front section 41 and the rear section 42 near the guiding ring 51.

With reference to FIG. 6, a height of a positioning point of the webbing adjustment device 1 on the webbing 40 can be adjusted by the user. The frame 10 or the slider 20 can be held by one hand of the user. The relative motion between the frame 10 and the slider 20 is generated, or change an angle of the webbing adjustment device 1 to unlock the rear section 42 of the webbing 40. The webbing adjustment device 1 can be pushed upward or pulled downward by the user with stepless adjustment. When the webbing adjustment device 1 moves to a suitable position, the webbing adjustment device 1 can be released by the user. Under the tension of webbing 40, the frame 10 and the slider 20 relatively move to secure the rear section 42 of the webbing 40, the webbing adjustment device 1 generates sufficient friction to lock the webbing 40 automatically. Then, the rear section 42 of the webbing 40 between the tongue 52 of the seat belt system and the guiding ring 51 is not allowed to move relative to the webbing adjustment device 1.

With reference to FIG. 8, the frame 10 is pushed upward by the user to adjust the height of the webbing adjustment device 1. The frame 10 is moved upward relative to the slider 20 or the angle of the webbing adjustment device 1 is changed. Thus, the frame 10 and the slider 20 do not generate sufficient force to secure the rear section 42 of the webbing 40. The rear section 42 of the webbing 40 cannot be fixed with the frame 10 and the slider 20. The webbing adjustment device 1 can be moved upward relative to the rear section 42 of the webbing 40.

With reference to FIG. 9, the slider 20 is pushed downward by the user to adjust the height of the webbing adjustment device 1. The slider 20 is moved downward relative to the frame 10 or the angle of the webbing adjustment device 1 is changed. Thus, the frame 10 and the slider 20 do not generate sufficient force to secure the rear section 42 of the webbing 40. The rear section 42 of the webbing 40 cannot be fixed with the frame 10 and the slider 20. The webbing adjustment device 1 can be moved downward relative to the rear section 42 of the webbing 40.

After the height of the webbing adjustment device 1 is adjusted, with reference to FIG. 6, the webbing adjustment device 1 is released by the user. Under the tension of webbing 40, the frame 10 and the slider 20 relatively move to secure the rear section 42 of the webbing 40, the webbing adjustment device 1 generates sufficient friction to lock the webbing 40 automatically. Then, the rear section 42 of the webbing 40 between the tongue 52 of the seat belt system and the guiding ring 51 is not allowed to move relative to the webbing adjustment device 1.

With reference to FIGS. 10 to 13, a second embodiment of the webbing adjustment device 1A for a seat belt system in accordance with the present invention comprises a frame 10, a slider 20, and a cover 30. The structure of the frame 10 in the second embodiment of the webbing adjustment device 1A is same as the structure of the frame 10 in the first embodiment of the webbing adjustment device 1. The structure of the slider 20 in the second embodiment of the webbing adjustment device 1A is same as the structure of the slider 20 in the first embodiment of the webbing adjustment device 1.

The cover 30 is moveably mounted on the frame 10 and has a base 31 and two side plates 32. The base 31 has a top end, two side ends, and a stop portion 33. The stop portion 33 is formed on the top end of the base 31 and is mounted above the first end portion 21 of the slider 20. The side plates 32 are formed on the side ends of the base 31 respectively. Each side plate 32 has an inner surface, a slide groove 34, and a retaining portion 35. The slide groove 34 extends vertically and is formed in the inner surface of the side plate 32. The retaining portion 35 is formed below the slide groove 34. With reference to FIG. 17, a moveable gap 29 is formed between the stop portion 33 of the cover 30 and the first end portion 21 of the slider 20, The frame 10 has two side edges beside the first hole 11 and inserted into the two slide grooves 34 of the cover 30 respectively.

With reference to FIGS. 14 and 15, the webbing adjustment device 1A is mounted on the webbing 40 of the seat belt system. The webbing adjustment device 1A is connected between the front section 41 of the webbing 40 and the rear section 42 of the webbing 40 below the guide ring 51 of the seat belt system. The front section 41 is directly passed through the second hole 12 of the frame 10. With reference to FIG. 16, the connecting strap 13 is connected to the frame 10 by extending through the second hole 12 of the frame 10. The connecting element 14 is connected to the connecting strap 13 and the front section 41 of the webbing 40.

With reference to FIGS. 14 and 15, the rear section 42 of the webbing 40 is passed between the side plates 32 of the cover 30. The rear section 42 of the webbing 40 is inserted through the first hole 11 of the frame 10 and the through groove 24 of the slider 20 up to down. The rear section 42 of the webbing 40 is locked or unlocked by the relative motion between the frame 10 and the slider 20. The webbing adjustment device 1A forms a positioning sliding point between the front section 41 and the rear section 42 adjacent to the guiding ring 51.

With reference to FIGS. 14 and 15, to adjust the height of the positioning point of the webbing 40, the user holds the cover 30 by one hand to make the cover 30 drive the frame 10 or the slider 20. The relative motion between the frame 10 and the slider 20 is generated to unlock the rear section 42 of the webbing 40. The webbing adjustment device 1A may be pushed upward or pulled downward by the user with stepless adjustment. When the webbing adjustment device 1A moves to a suitable position, the webbing adjustment device 1A may be released by the user. Under the tension of webbing 40, the frame 10 and the slider 20 relatively move to secure the rear section 42 of the webbing 40, the webbing adjustment device 1 generates sufficient friction to lock the webbing 40 automatically. Then, the rear section 42 of the webbing 40 between the tongue 52 of the seat belt system and the guiding ring 51 is not allowed to move relative to the webbing adjustment device 1A.

With reference to FIGS. 13 and 17, the cover 30 is pushed upward by the user to adjust the height of the webbing adjustment device 1A. The frame 10 is pushed upward by the retaining portions 35 respectively formed below the slide groove 34 of the cover 30. The frame 10 driven by the cover 30 is moved upward relative to the slider 20. Thus, the frame 10 and the slider 20 do not generate sufficient force to secure the rear section 42 of the webbing 40. The rear section 42 of the webbing 40 cannot be fixed with the frame 10 and the slider 20. The webbing adjustment device 1A can be moved upward relative to the rear section 42 of the webbing 40.

With reference to FIG. 18, the cover 30 is pushed downward by the user to adjust the height of the webbing adjustment device 1A. The slider 20 is moved downward by the stop portion 33 of the cover 30. The slider 20 driven by the cover 30 is moved downward relative to the frame 10. Thus, the frame 10 and the slider 20 do not generate sufficient force to secure the rear section 42 of the webbing 40. The rear section 42 of the webbing 40 cannot be fixed with the frame 10 and the slider 20. The webbing adjustment device 1A can be moved downward relative to the rear section 42 of the webbing 40.

After the height of the webbing adjustment device 1A is adjusted, with reference to FIG. 15, the cover 30 is released by the user. Under the tension of webbing 40, the frame 10 and the slider 20 relatively move to secure the rear section 42 of the webbing 40, the webbing adjustment device 1 generates sufficient friction to lock the webbing 40 automatically. Then, the rear section 42 of the webbing 40 between the tongue 52 of the seat belt system and the guiding ring 51 is not allowed to move relative to the webbing adjustment device 1A.

With reference to FIGS. 19 to 22, a third embodiment of the webbing adjustment device in accordance with the present invention comprises a frame 10 and a slider 20A. The structure of the frame 10 in the third embodiment of the webbing adjustment device is same as the structure of the frame 10 in the first embodiment.

The slider 20A has a first end portion 21A, a second end portion 22A, and a connecting portion 23A. The connecting portion 23A is formed between the first end portion 21A and the second end portion 22A. A length of the first end portion 21A and a length of the second end portion 22A are both longer than a length of the frame 10. The connecting portion 23A has two connecting surfaces 26A, a protrusion 28A, and two spaces 27A. The connecting surfaces 26A are formed in the connecting portion 23A, face each other, and are both connected to the first end portion 21A and the second end portion 22A.

With reference to FIGS. 22 and 23, the protrusion 28A is formed on the second end portion 22A, extends toward the first end portion 21A, is located in the through groove 24A of the slider 20A, and is inserted through the first hole 11 of the frame 10. The two spaces 27A are formed through the connecting portion 23A from the top surface of the connecting portion 23A to the bottom surface of the connecting portion 23A. The two spaces 27A are located between the protrusion 28A and one of the connecting surfaces 26A. In addition, the protrusion 28A is a wedge. The through groove 24A has a slant section formed in the connecting portion 23A. The slant section is slanted from the second end portion 22A toward the bottom of the first end portion 21A. A flange 25A is formed on the top of the second end portion 22A adjacent to the through groove 24A.

With reference to FIGS. 19 to 22, the frame 10 is inserted through the through groove 24A of the slider 20A. The protrusion 28A of the connecting portion 23A of the slider 20A is inserted into the first hole 11 of the frame 10. The first end portion 21A and the second end portion 22A are respectively located at two sides of the frame 10. The two side edges of the frame 10 are inserted through the spaces 27A of the connecting portion 23A respectively.

By comparison with the first embodiment of the webbing adjustment device as disclosed in FIGS. 1 to 4, in the third embodiment, the length of the first end portion 21A and the length of the second end portion 22A in the third embodiment of the webbing adjustment device are increased. The frame 10 may be inserted through the through groove 24A of the connecting portion 23A of the slider 20A. The two side edges of the frame 10 are inserted through the spaces 27A of the connecting portion 23A respectively. With reference to FIGS. 23 and 24, an operation of the third embodiment of the webbing adjustment device is substantially identical with that of the first embodiment and detailed descriptions thereof are omitted.

Accordingly, the webbing adjustment device 1, 1A is mounted around the webbing of the seat belt system and is located between the front section 41 and the rear section 42 of the webbing 40. The rear section 42 of the webbing 40 is passed through the webbing adjustment device 1, 1A. The positioning point of the webbing 40 near the guiding ring 51 is restricted by the webbing adjustment device 1, 1A for protecting the user's neck from slashing by the webbing 40. The relative motion between the frame 10 and the slider 20, 20A is generated to unlock the webbing 40. The webbing adjustment device 1, 1A may be moved upward and downward to a suitable position. Then, the webbing adjustment device 1, 1A locks the webbing 40 by the tension of the webbing 40. A height of the positioning point of the webbing adjustment device 1, 1A on the webbing 40 is adjusted by the webbing adjustment device 1, 1A. The positioning point of the webbing 40 is close to the height of the shoulder of the user.

In addition, the webbing adjustment device 1, 1A is adapted to various types of vehicles. The webbing adjustment device 1, 1A is simplified in structure, easy in operation, and cost-effective in manufacture and assembly. The webbing adjustment device 1, 1A can be adjusted steplessly and continuously with long adjustment strokes. The webbing adjustment device 1, 1A is easy to operate and automatically locks the webbing 40.

What is claimed is:
1. A webbing adjustment device for a seat belt system, the webbing adjustment device comprising:
   a frame having:
      a first hole formed through the frame;
      a second hole formed through the frame below the first hole of the frame, wherein a front section of a webbing extends through the second hole of the frame and is slidably connected to the frame; and
      two side edges beside the first hole;
   a slider moveably and detachably connected to the frame and having:
      a first end portion formed on the slider;
      a second end portion formed on the slider and being opposite to the first end portion of the slider;
      a connecting portion formed on the slider between the first end portion and the second end portion of the slider, and the connecting portion having a top surface and a bottom surface; and
      a through groove formed through the connecting portion from the top surface of the connecting portion to the bottom surface of the connecting portion; and a cover moveably mounted on the frame and having:
  a base having:
    a top end;
    two side ends; and
    a stop portion formed on the top end of the base and mounted above the first end portion of the slider; and
  two side plates formed on the two side ends of the base respectively and each side plate having:
    an inner surface;
    a slide groove extending vertically and formed in the inner surface of the side plate, and each one of the two side edges of the frame inserted into the slide groove; and
    a retaining portion formed below the slide groove; and
a moveable gap formed between the stop portion of the cover and the first end portion of the slider, and
wherein the connecting portion of the slider is inserted through the first hole of the frame, and a rear section of the webbing is inserted through the first hole of the frame and the through groove of the slider, and the rear section of the webbing is locked or unlocked by a relative motion between the frame and the slider.

2. The webbing adjustment device as claimed in claim 1, wherein the front section of the webbing is inserted through the second hole of the frame.

3. The webbing adjustment device as claimed in claim 1, wherein the webbing adjustment device has:
  a connecting strap connected to the frame by extending through the second hole of the frame; and
  a connecting element connected to the connecting strap and connected to the front section of the webbing.

* * * * *